Figure 5:
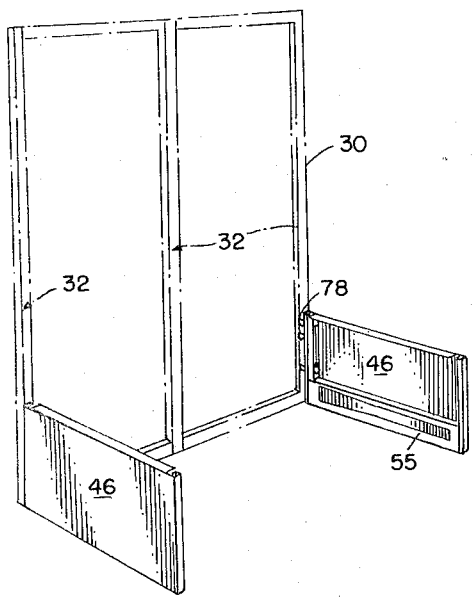

Feb. 21, 1967  J. G. FENWICK  3,305,286
FURNITURE
Filed April 27, 1964  7 Sheets-Sheet 1
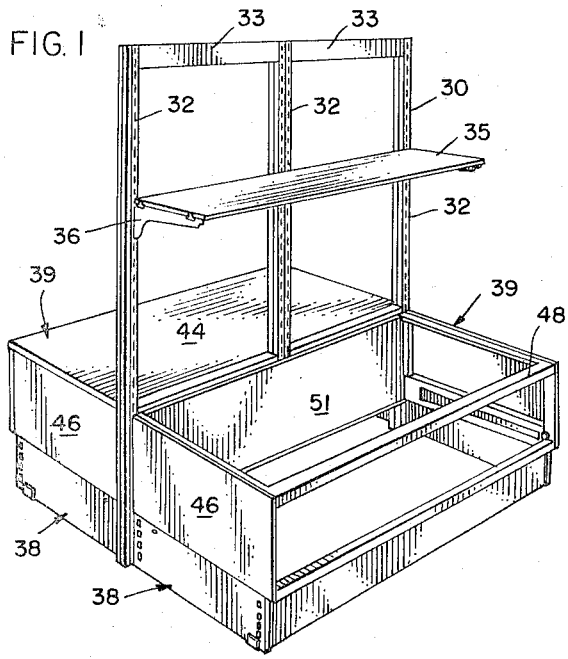
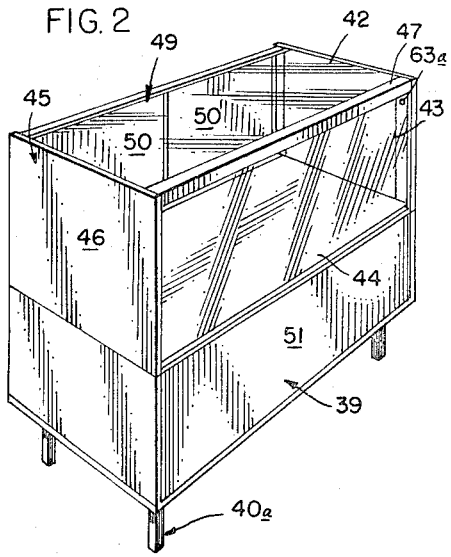
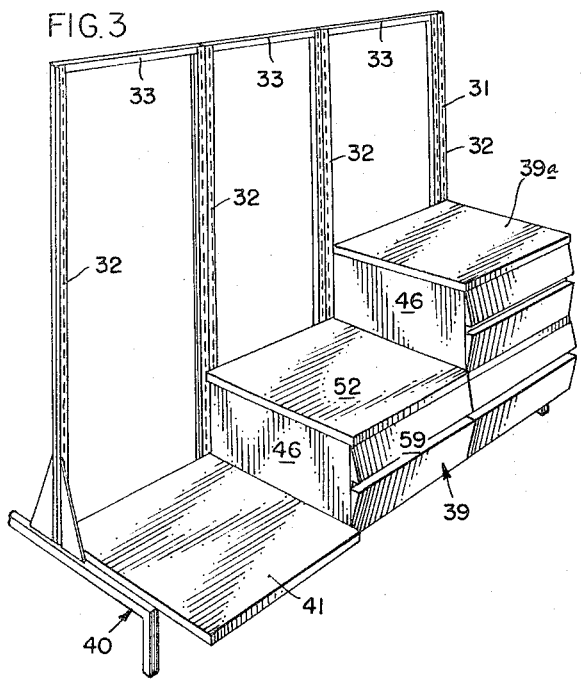
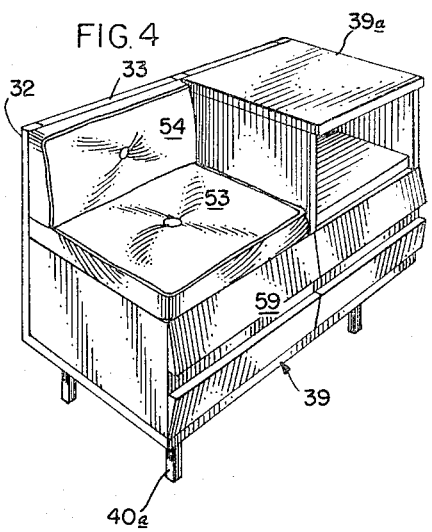
INVENTOR:
JAY G. FENWICK
BY
Dawson, Tilton, Fallon, Lungmus & Alexander
ATT'YS Feb. 21, 1967  J. G. FENWICK  3,305,286
FURNITURE Filed April 27, 1964  7 Sheets-Sheet 2

INVENTOR:
JAY G. FENWICK
BY
Dawson, Tilton, Fallon, Lungmus & Alexander
ATT'YS

Feb. 21, 1967  J. G. FENWICK  3,305,286
FURNITURE

Filed April 27, 1964

7 Sheets-Sheet 5

INVENTOR:
JAY G. FENWICK
BY
Dawson, Tilton, Fallon, Lungmus & Alexander
ATT'YS

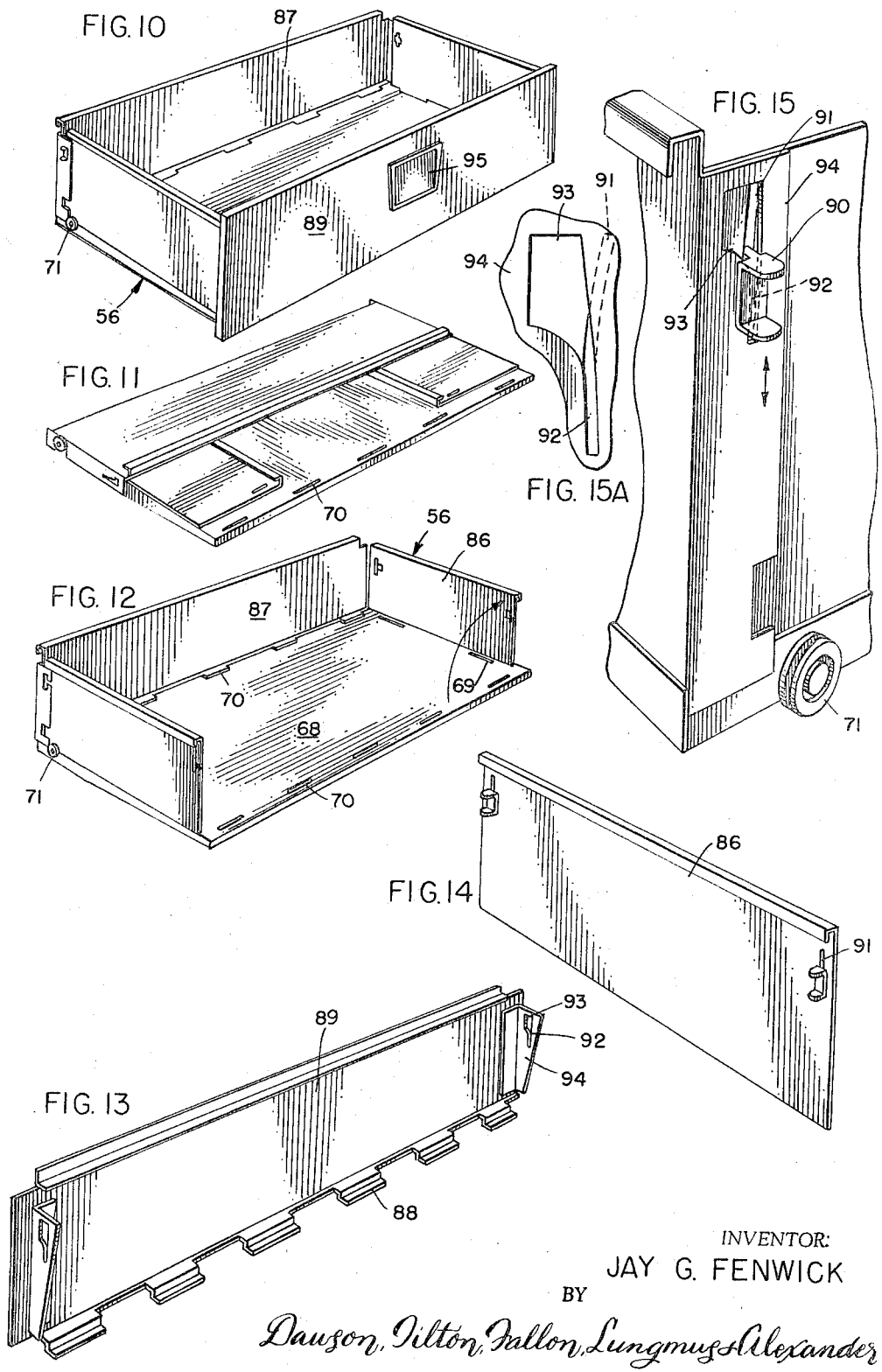

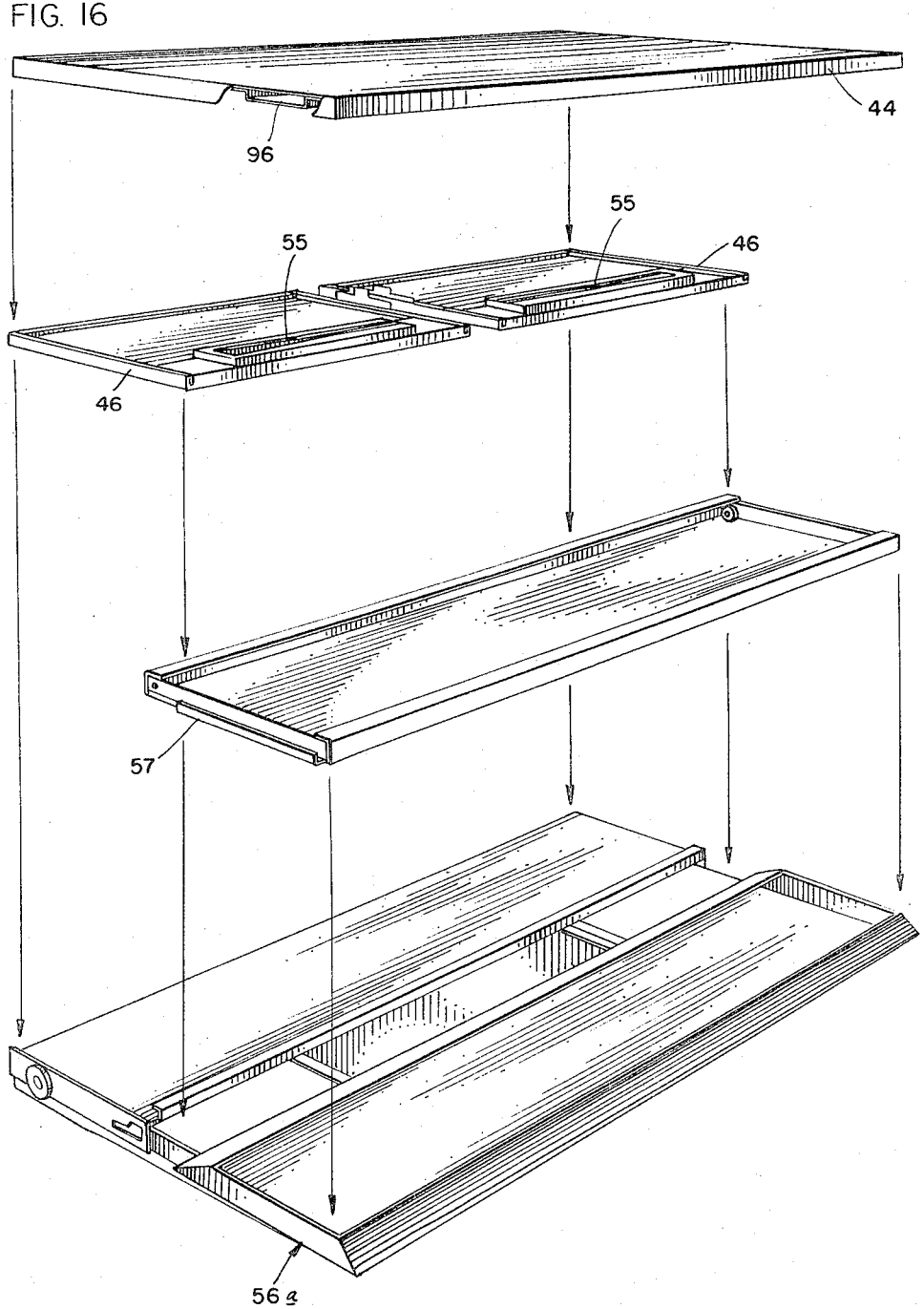

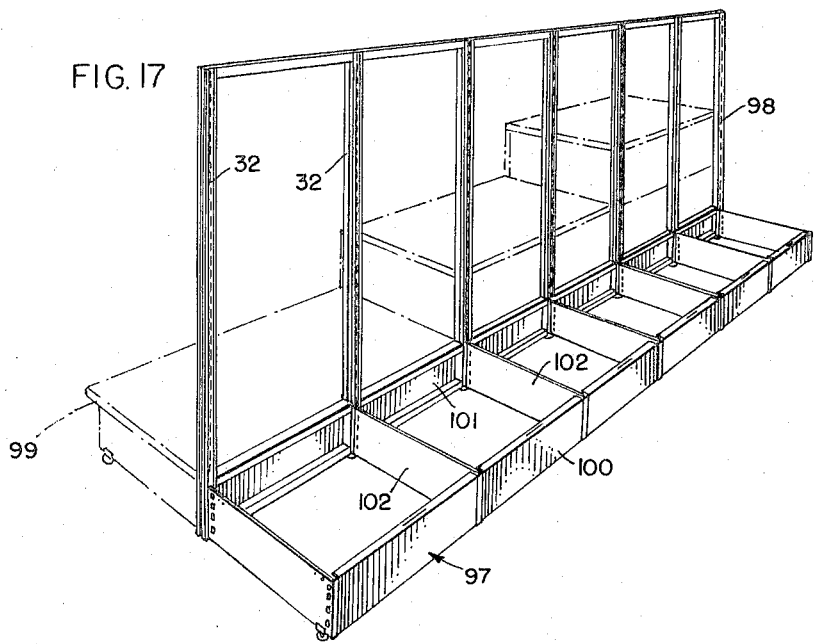
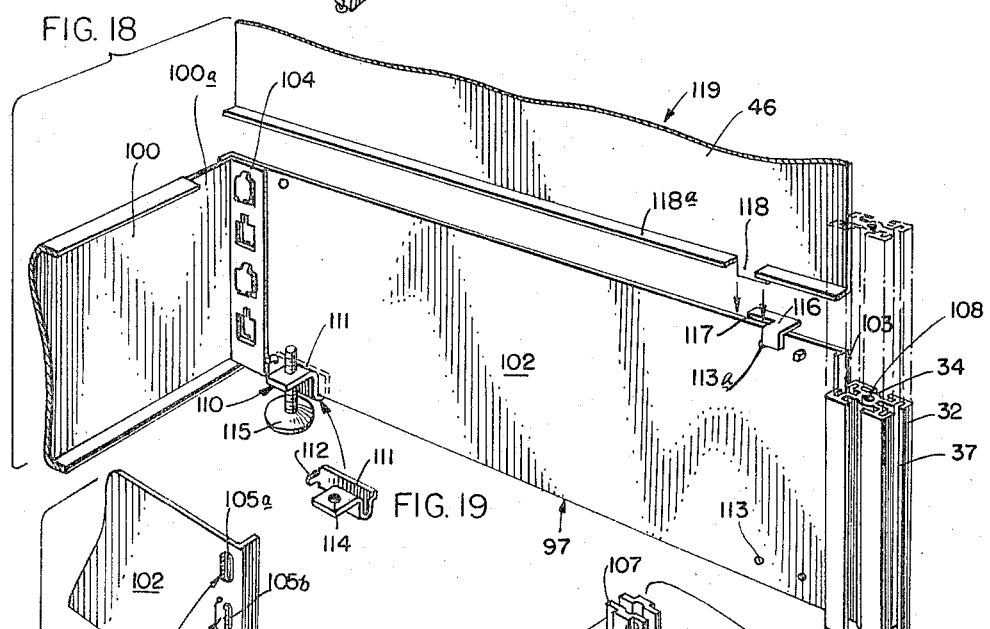
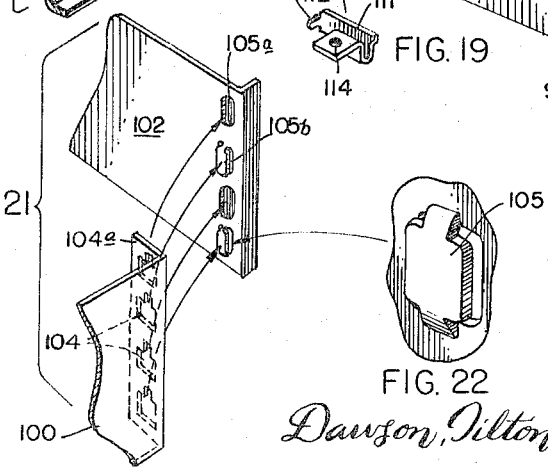

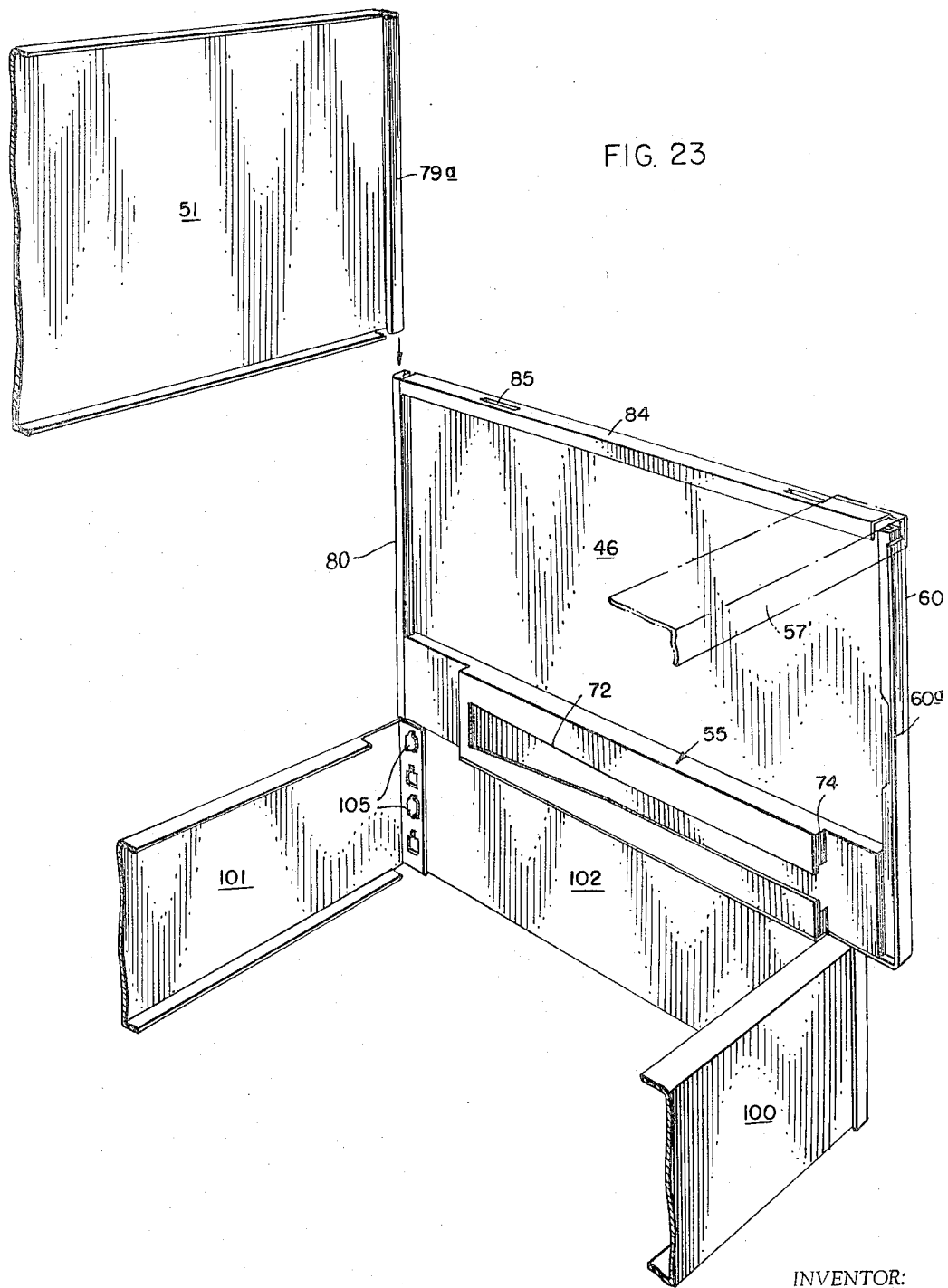

though the invention is described in connection with store furnishings: counters, gondolas, display racks, etc.— in order to present the best mode contemplated of practicing the invention—it will be immediately appreciated that non-retail store uses are also available.

United States Patent Office 3,305,286
Patented Feb. 21, 1967

3,305,286
FURNITURE
Jay G. Fenwick, Mundelein, Ill., assignor to Morton Manufacturing Company, Chicago, Ill., a corporation of Illinois
Filed Apr. 27, 1964, Ser. No. 362,712
5 Claims. (Cl. 312—263)

This invention relates to furniture, and more particularly, to a furnishing unit and method of use thereof which has advantageous application as a store fixture.

Although the invention is described in connection with store furnishings: counters, gondolas, display racks, etc.— in order to present the best mode contemplated of practicing the invention—it will be immediately appreciated that non-retail store uses are also available.

In retail store operation, a wide variety of fixtures are normally required. Normally, the structure and styling of the fixture is dictated by the goods it carries. With the increasing diversity of products found in stores, it has not been possible to provide fixtures tailored to particular goods. This stems from a number of factors:

(1) Storage: This is a two-pronged problem. First, the fixtures themselves require storage from time to time when the merchandise they carry is "out of season." Secondly, the fixtures themselves must provide adequate acceptable storage for the merchandise they display. Alternatively, this complex problem can be spoken of in terms of the need to cater to "impulse buying" which is developed by presenting the store with a "new face." Regular patrons, following along a habitual path, may purchase a newly displayed item if it is readily available in their particular size, color, etc.

(2) Assembly and disassembly: This complex factor, along with the first-mentioned storage factor, is a matter of housekeeping. Nowadays, skilled help is hard to come by, so that elaborate fixtures are usually avoided. This means that the standardized counters used will usually lack maximum patron appeal for the particular merchandise shown. The lack of skilled help not only interferes with setting up fixtures which complement the merchandise they are to carry, but also prevents the ready disassembly of such fixtures. Disassembly is necessary to obtain the maximum eye appeal at prominent points throughout the different seasons and buying periods of the year.

(3) Shipment: In the past, the actual transportation of the fixture to a site of installation has involved considerable expense. These items must necessarily have considerable void space required for storage of the goods they are to display. If the fixtures are shopped "knocked down," there is the difficult problem of assembly using unskilled help.

The factors outlines above have resulted in an unsatisfactory situation in the use of store fixtures. The industrial designers and merchandising experts have often been limited by an irrelevant factor—the space available nearby for storing fixtures in offseason periods. With the contemporary trend to compact buildings on one or two levels, the storage problem has become aggravated. All of this is avoided by the invention here.

The invention provides novel store fixtures which are characterized by unique boltless connections, being made up of a plurality of planar parts which can be shipped or stored in compact arrangement, usually less than three inches in thickness.

The provision of such an advantageous fixture and the use of the same thus constitute important objects of this invention. A correlative object is to provide a fixture module which can be developed into a variety of arrangements so as to give the store decorator, for the first time, a versatile approach to merchandising—now the merchandise can be presented in and on fixtures best calculated to show it to advantage. It no longer is necessary to "make do" with whatever was available, superficially garnished, in an attempt to "highlight" the particular goods being displayed.

Still another object is to provide a plurality of unique fixture parts, such as foldable drawers, novel slide rails, disassemblable bases or gondolas, which coact in different ways to give the merchandiser the same wide variety of arrangements (upwards of 200 or so) that he had available previously, but through the use of only 25 to 30 basic components.

Other objects and advantages of the invention may be seen in the details of construction and operation set down in this specification.

The invention is explained in conjunction with the accompanying drawing, in which—

Figure 6:
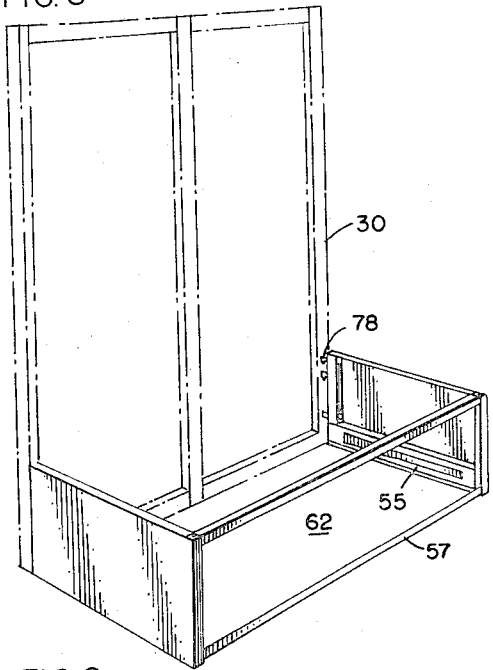
Figure 7:
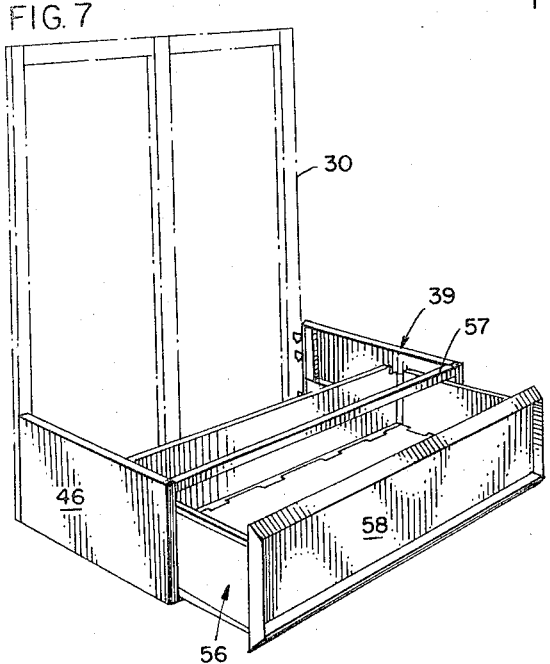
Figure 8:
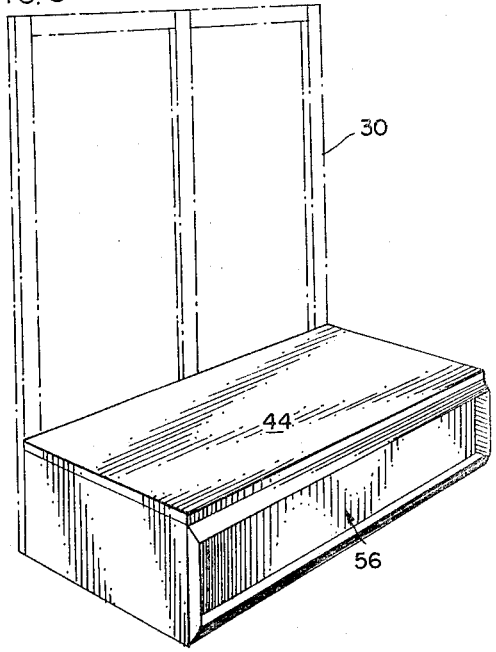
Figure 9:
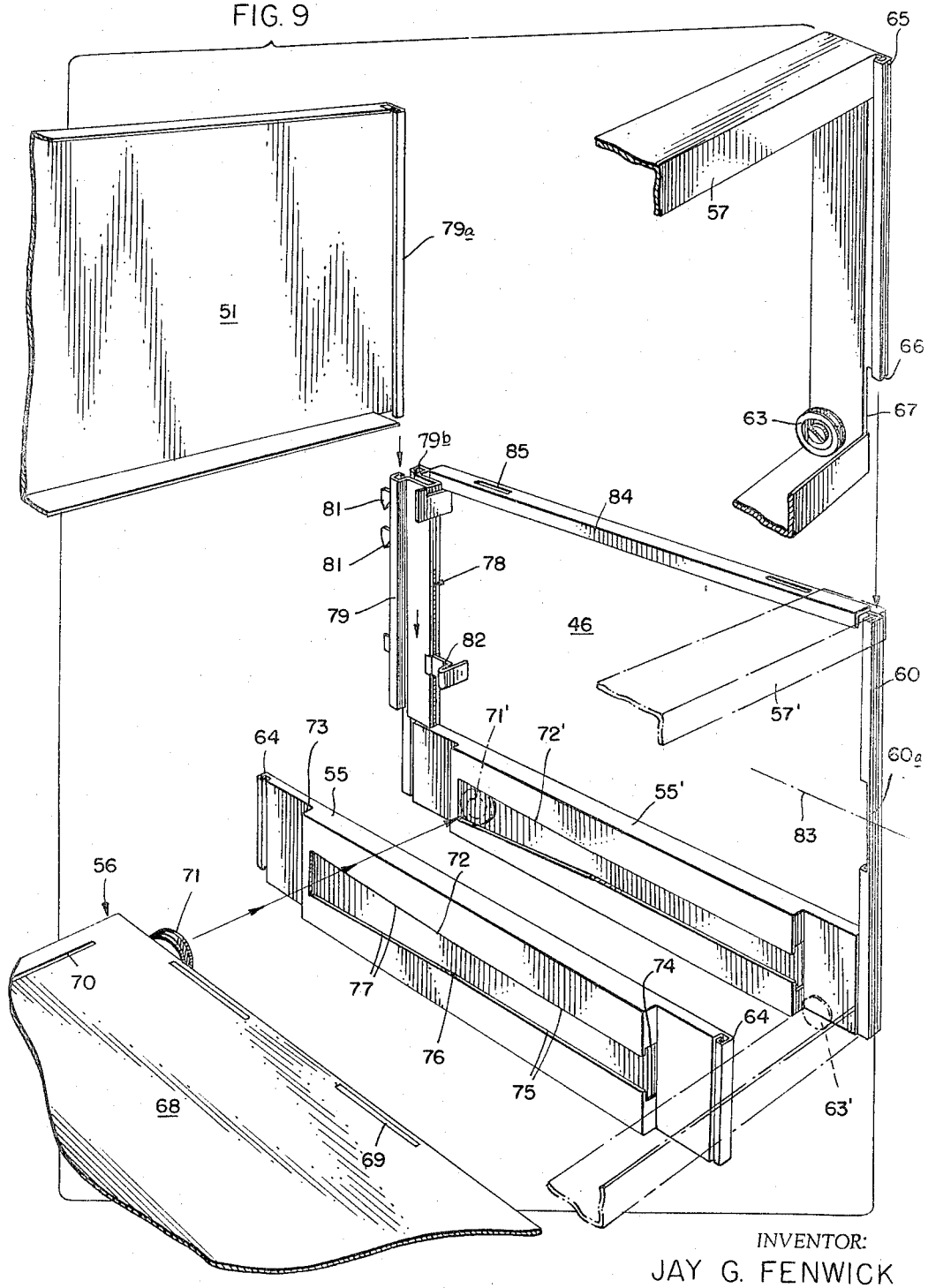

The first sheet of the drawing includes four views, each of a different furniture unit but each made up of basic modules of the invention: FIG. 1 being a perspective view of a shelf-equipped, single-drawer fixture, with the drawer removed to show interior details of construction; FIG. 2 is a perspective view of a display case having a glass top and front utilizing teachings of the invention; FIG. 3 is a fragmentary elevational view of a stack of module display units; and FIG. 4 is a perspective view of another furniture unit wherein the modules are arranged to provide drawer space and a seat;

The second sheet of the drawing also includes four perspective views, which show the steps in developing one type of module: FIG. 5 showing the side bulkheads of a drawer unit being attached to a vertical frame, the frame being shown in dotted lines; FIG. 6 shows a later stage in the development of the drawer unit wherein the front frame is connected to the side bulkheads; FIG. 7 is at a yet later stage, and shows the drawer being inserted into the frame made up of the front and side members; and FIG. 8 is a perspective view of the completed drawer unit;

The third sheet of the drawing shows an exploded, perspective view—FIG. 9—of the components of the drawer unit shown in the course of development in FIGS. 5-8, the showing in FIG. 9 also being enlarged and fragmentary so as to better bring out certain advantageous details of construction;

The fourth sheet of the drawing presents six views showing details of the drawer itself, FIG. 10 being a perspective view of the drawer in operative condition; FIG. 11 a perspective view of the drawer in fully collapsed condition; FIG. 12 a perspective view showing the drawer in partially erected condition; FIG. 13 a perspective view of the back wall of the drawer; FIG. 14 a perspective view of the side wall of the drawer; FIG. 15 a fragmentary perspective view of a corner connection between the side and rear walls of the drawer; and FIG. 15A is an enlargement of the coacting slots of FIG. 15;

The fifth sheet of the drawing shows an exploded view—FIG. 16—in perspective form of the various portions of the drawer unit of FIGS. 5-9 as they would be combined for shipment in a compact package or the form in which they could be stored in off season;

The sixth sheet of the drawing includes FIGS. 17-22; FIG. 17 being a perspective elevational view of yet another advantageous arrangement of furniture modules made possible by the invention; FIG. 18, an enlarged fragmentary sectional view of a portion of the fixture of FIG. 17 and in which certain novel levelling devices are shown in separate views in FIGS. 19 and 20; FIG. 21, an exploded perspective view in fragmentary form of the corner connections of the fixture of FIGS. 17 and 18; while FIG. 22 is an enlargement of a portion of the showing in FIG. 21; and The last sheet is similar to FIG. 9 but shows in fragmentary perspective view as FIG. 23 the drawer frame arrangement of FIG. 1.

Turning now to the first sheet of the drawing, the four views illustrate not only the diversity of fixtures required in stores, but further show the versatility of the instant invention in satisfying this complex need. FIGS. 1 and 3 show modular units provided as part of a superstructure as at 30 and 31, respectively. In contrast to this, the showings in FIGS. 2 and 4 have to do with "free standing" furniture units. In any event, each of the units may be completely disassembled rapidly for storage in a matter of minutes, since the connections are all "boltless." The interfit of the various parts develops an advantageous rigidification heretofore deemed impossible without the use of bolts, welds, etc. In FIG. 1, the superstructure 30 is made up of standards which have a unique cross-sectional configuration—see FIG. 18—and which are adapted to receive metal locking strips for anchoring various components. Further details of the construction and operation of the posts 32 providing a portion of the superstructure 30 can be seen in my copending application, Serial No. 341,072, filed January 19, 1964, now Patent 3,182,812.

In the precise illustration given in FIG. 1, the various standards 32 are interconnected at their upper ends by horizontal stringers 33 suitably anchored in the side channels 34 of the standards 32 (again see FIG. 18). Additionally, a shelf 35 is supported on L-shaped brackets 36 secured to the front channels 37 of the posts 32 (again see FIG. 18).

Now referring to FIG. 1, the bottom portion of the unit includes a pair of bases each generally designated 38 and which are substantially identical. The construction of each gondola-like base 38 is unique in itself, and will be explained in greater detail in connection with the last drawing sheet, FIGS. 17–22. Here, however, the base 38 serves to support a drawer unit generally designated 39, further details of which will be described in connection with drawing sheets 2–5.

The same type of drawer unit 39 is found in the fixture of FIG. 3. In FIG. 3, the superstructure 31 is again made up of a plurality of standards 32 which are carried on a pedestal generally designated 40. The pedestal 40 is essentially rectangular in plan, and each end is equipped with a U-shaped leg, only a fragment of which is seen in FIG. 3. This accommodates the stepped or stacked arrangement seen in FIG. 3, wherein the initial step 41 is essentially a platform for the storage of goods normally provided in such readily accessible manner. The second step is provided through the drawer unit 39 previously mentioned, while the third step is provided by a narrower drawer unit designated 39a and which is essentially the same in construction and operation as the unit 39—save for dimensional differences. As before, the upper ends of the standards 32 are interconnected by means of stringers 33.

The free standing unit of FIG. 2 also includes a drawer unit 39 suitably supported on a sub-base generally designated 40a. In FIG. 2, the drawer unit 39 is oriented to position the rear side facing the viewer. This makes the drawer accessible to a clerk standing behind the counter and serving a customer looking either downwardly through the top pane 42, or into the front pane 43 at merchandise supported on the cover 44 of the drawer unit 39. A similar cover is designated 44 in FIG. 1. The glassed unit generally designated 45 of the unit in FIG. 2 is essentially a modified drawer unit utilizing the same side or end bulkheads as at 46. The front wall 47, including the pane 43, is essentially similar to the front frame 48 provided on the drawer unit 39 of FIG. 1. The rear wall generally designated 49 in the upper portion 45 of the unit of FIG. 2 includes sliding doors as at 50 which mark another difference between the portion 45 and the drawer unit 39. In contrast, the drawer unit 39 includes a single rear wall as at 51 (see both FIGS. 1 and 2).

The furniture unit of FIG. 4 is seen to embody the modular pieces of the preceding views, viz., the sub-base 40a, the drawer unit 39, and a smaller drawer unit 39a (although in the case of FIG. 4, the actual drawer itself is omitted to provide a shelf). In addition to the cover 52 provided on the corresponding unit of FIG. 3, the unit of FIG. 4 includes a pair of cushions 53 and 54 to provide a seat whereby the unit in FIG. 4 may not only be useful as a store unit but also as a home or office unit, as the case may be.

*Assembly of drawer units*

Reference is now made to the second drawing sheet, wherein the superstructure 30 of FIG. 1 is seen in the process of being equipped with the side bulkheads 46. It will be appreciated that the base 40 may be omitted—and this is the case in FIGS. 5–8, simplifying the illustration. As mentioned previously, a clip bracket or plate arrangement is utilized (see element 78 in FIG. 9) which may correspond to that described in my above-mentioned copending patent application, to secure the bulkheads 46 to the vertical standards 32. Each side bulkhead 46 is seen to be equipped with a track unit 55 therein for the purpose of guiding the drawer 56 (see FIG. 6).

FIG. 6 represents a stage of assembly just subsequent to that seen in FIG. 5 and wherein the front ends of the side bulkheads 46 are secured together by means of the front frame 57. As will be explained with reference to FIG. 9, the front frame 57 not only serves to define the rectangular enclosure for the drawer 56, but also uniquely stabilizes the truck units 55.

In FIG. 7, the drawer generally designated 56 is seen in the process of being inserted into the almost complete drawer unit 39 defined by side bulkheads 46 and front frame 57. The completed unit 39 is seen in FIG. 8 where the top 44 has been applied to the now-united elements 46 and 57. In the views pictured on the second drawing sheet, notably FIGS. 6 and 7, the rear wall 51 (see FIG. 9) of the drawer unit 39 has been omitted—this being optional, depending upon the use of the unit. It will be apreciated that the unit is enclosed when the drawer 56 is installed in the position shown in FIG. 8, so that the provision of the rear wall 51 (as in FIG. 1) is a matter of choice. The alternative ways of utilizing the rear wall 51 can be seen in FIGS. 9 and 23. In FIG. 9, the drawer unit is connected to the standard in the fashion of FIG. 3 so the rear wall 51 is connected to the bracket 78. In FIG. 23, the rear wall 51 is connected to the bulkheads 46 in the fashion of FIG. 1, the bracket 78 being omitted.

It will also be noted that the drawer 56, as seen in FIGS. 7 and 8, is characterized by a somewhat different front face as at 58 than that seen at 59 in FIGS. 3 and 4. Not only is the surface configuration of the drawer fronts different, but it is also possible to provide attractive patterns through the use of vinyl-clad steel. Heretofore, in the manufacture of store fixtures, this has not been possible for the most part, since welding is required.

In the past, as pointed out previously, the store fixture field required an extensive inventory of equipment consisting of different drawer units, showcases, bases, sliding door units, cashier units, display units—every item from shirts to nylons requiring a specialized unit. With the inventive equipment, there is not only versatility but interchangeability, as will now be brought out, particularly relative to the drawer unit shown in FIG. 9.

The first moiety or element usually installed in the development of a drawer unit 39 is the side bulkhead 46. The bulkhead 46 is generally rectangular in outline, and along each of its two vertical edges (in the installed condition) is equipped with a U-shaped, integral flange as at 60. The flange 60 ultimately accommodates the front frame 57, as indicated by the dashed line shown as at 57'. The front frame 57 is perimetric (as shown in FIG.

6) to define a central opening 62 which ultimately receives the drawer 56. On each vertical leg adjacent the bottom, the front frame 57 is equipped with a grooved roller as at 63, which ultimately assumes the position designated 63' (see the dashed line showing adjacent the bottom of FIG. 9).

Prior to the insertion of the front frame 57, a track unit 55 is installed in each side bulkhead 46 (see also FIG. 5). The track unit 55 is shown in its installed condition in dashed line and is designated 55'. For the purpose of interconnecting the bulkhead 46 and the track unit 55, the track unit 55 is equipped with an L-shaped projecting flange 64 at each end thereof, adapted to mate with the complementary flange 60 on the bulkhead 46.

Reference to the upper right-hand corner of FIG. 9 reveals that the front frame 57 is also equipped with an L-shaped flange 65 essentially similar to that provided on the track unit 55. It will further be noticed that the flange 65 on the front frame 57 extends only a portion of the height of the front frame member, terminating as at 66. This then provides a notched-out portion 67 on the front frame 57 accommodating the track unit 55. Further, the weight of the front frame 57 bears down on the track unit 55 to stabilize the track. This is particularly advantageous, since the track, if upset, may cause the drawer to bind when it is moved in or out.

The drawer generally designated 56 is shown only fragmentarily in FIG. 9, and the fragment shown is the bottom 68. The bottom 68 is equipped with slots 69 and 70 to accommodate the upstanding walls (not shown, but which will be described hereinafter). Additionally, the bottom 68 is equipped with a grooved roller 71 suitably journaled on the bottom 68 for coaction with an elongated slot 72 provided in the track unit 55. The position of the roller 71 when installed is designated 71' and is seen to be at the extreme inner end of the slot 72'.

The slot 72 is advantageously provided through using a stepped portion as at 73 on the track-providing unit 55. The roller 71 enters the stepped portion as at 74 and initially rolls along the slot 72 defined by parallel sides as at 75. At the drawer unit center line, i.e., 76, the sides diverge as at 77 to provide self-closing of the drawer. The inclination of the side 77 to the first side portion 75 is of the order of 2°. The roller 71 rides on the lower side 77—the symmetrical slot being provided to permit use of the track unit 55 on either the left-hand or right-hand bulkhead.

At the extreme rear of each bulkhead 46, a coupling member generally designated 78 is provided to attach the bulkhead 46 to a standard 32 (see FIG. 5). The coupling member 78 is seen to be equipped with a first longitudinally-extending channel 79, which coacts with a complementary flange 79a provided on the vertical side of the rear wall 51 to support the rear wall if such is desired. The second channel 79b is engaged by the rear bulkhead flange 80 (see FIG. 23). For this purpose, the member 78 is moved downwardly in the direction of the arrow in FIG. 9 when engaging a bulkhead 46. Additionally, the coupling member 78 is equipped with a plurality of projecting lugs 81 which serve to engage the locking channel provided in the standards 32. The coupling member 78 is equipped with a slidable element 82 constituting a stop extending into the slotted standard 32 to prevent disengaging of locking lugs 81.

It will be appreciated that the bulkhead 46 is symmetrical about a horizontal center line as at 83, so that only one form of bulkhead 46 need be provided to accommodate both the left and right sides of the drawer unit 39. Inasmuch as the track unit 55 is also symmetrical about a longitudinal, i.e., horizontal, center line, only one version of that element is needed to provide both the left-and right-hand sides. In the case of the front frame 57, there is also interchangeability in the fact that the unit may be reversed so as to position the rollers 63 uppermost. This is of distinct advantage in the case of the unit shown in FIG. 2, where the rollers 63 are removed and the tapped holes provided in the frame 57 used instead for mounting fluorescent light sockets, as at 63a in FIG. 2.

It will further be noted that the bulkhead 46 is equipped with an inwardly-turned flange as at 84 (see FIG. 9). This flange is slotted as at 85 to accommodate stacked units. Since it is impossible to provide both this flange 84 and insert the track unit 55 from the top (analogous to the fashion of inserting the front frame 57), I provide a cut-out portion as at 60a in the flange 60 to accommodate the insertion of the track unit 55. A corresponding cut-out is provided at the other end of the bulkhead 46 (obscured in FIG. 9 by virtue of the coupling member 78).

Method of assembly of drawer framing unit

The operation of the structure shown in FIG. 9 involves first mounting the two track units 55 in the corresponding bulkheads 46, utilizing the cut-out portions 60a to interlock the flanges 64 with the channel flanges 60. Next, the bulkheads 46 are equipped with the locking plates 78 and are attached to a suitable superstructure 30 (see FIG. 1). Thereafter, the rear wall 51 is installed by engaging the flange 79a with the guide channel provided by the flange 79. The unit is completed by installing the front frame 57 across the open front end portion—as by engaging the flanges 65 with the upper portions of the flanges 60. The drawer 56 is thereafter introduced, with the weight of the drawer being carried by both the track element 55 and the front frame 57—the latter via the rollers 63. This novel separation of loading not only stabilizes the track but in addition provides a collapsible module free of any bolt or welded connections.

Reference is now made to the fourth sheet of the drawing, on which are seen FIGS. 10–15. Reference to FIG. 12 reveals that the drawer generally designated 39 includes the previously-mentioned bottom 68 equipped with the rollers 71. The bottom 68 is slotted as at 69 to accommodate a side wall 86 (see also FIG. 14). Further, the slots 70 provided in the bottom 68 accommodate front and rear walls—the rear wall being seen in FIG. 12 and designated 87 while the front wall 89 is seen in FIG. 13.

The method of interconnecting the various walls with the bottom can be appreciated from a consideration of FIG. 13, wherein the front wall 89 is equipped with a plurality of depending stepped or Z-shaped lugs as at 88. The lugs 88 are engaged in the slots 70 by pivoting the rear wall 87 while moving the wall 87 toward the bottom wall 68. The operation contemplated is that, once the various walls are engaged, they will remain so. It is possible to selectively pivot the walls into generally parallel relation such as is seen in FIG. 11, whereby the drawer is arranged for shipment or storage in substantially a planar condition.

This is seen in slightly larger scale in FIG. 16, wherein the collapsed drawer is designated by the numeral 56a. With the drawer 2' x 4' in plan and normally 11" high, the entire arrangement can be collapsed into a package only about 3" high—the configuration designated 56a in FIG. 16. The showing in FIG. 11 differs from that in FIG. 16 in that the front wall 89 of the drawer 56 has been omitted for the purpose of showing additional details of construction. To convert from the organization of FIG. 10 to that of FIG. 11 (alternatively, the bottom portion of FIG. 16), it is only necessary to release the latches provided on the side walls 86—these latches being seen most clearly in FIG. 15 and designated 90. Each side wall 86 at each end thereof is equipped with a latch 90 riding in a suitable slot 91 (see FIG. 14). The lock element has a projecting portion which enters the enlarged part 93 of a slot 92 provided in a bracket 94 at each end of the front and rear walls 87 and 89.

FIG. 15A shows that the slots 91 and 92 have portions that are coincident at the bottoms thereof. However, the upper slot portions diverge—about 4° relative to each other. This develops a scissors action when the latch 90 is initially engaged. This draws the sides into proper relationship and requires positive pressure to disengage the latch. This means that turning the drawer upside down does not disengage the latch 90.

In the operation of the drawer 56, the unit may be advantageously assembled at the factory and shipped in interconnected, collapsed condition such as that shown at 56a in FIG. 16. Alternatively, the pieces may be shipped separately—as where a large new installation is involved and hundreds of drawers will be utilized. Then one case can contain all side walls 88, etc. In this connection, it will be noted that the side walls 86 are interchangeable. The provision of the slots 69 and 70 makes the erection foolproof if the parts are shipped individually. Further, when it becomes time to convert the fixture from one utilizing a drawer to one utilizing a gondola (see, for example, FIG. 17), the drawer can be advantageously stored in collapsed condition, ready to be reinstalled upon a moment's notice. All that is required is the movement of the four latches 90 so as to disengage the same from the slots 93 in the rear and front walls 87 and 89, respectively. The rear and front walls 87 and 89 are not interchangeable, since the front wall, equipped with some kind of pull means as at 95, has to be spaced from the end of the bottom wall 68 equipped with the roller 71. However, this in itself defines the ultimate position to eliminate any error in assembly.

Turning now to the fifth sheet of the drawing, the collapsed drawer previously referred to is designated 56a. Seen in FIG. 16 immediately above the drawer unit 56a is the front frame 57, and above that, the bulkheads 46 suitably equipped with the track units 55. In the arrangement illustrated in FIG. 16, the rear wall has been omitted, but it will be appreciated that this is generally coextensive with the front frame 57. If desired, the package unit of FIG. 16 could include the top 44 (see also FIG. 1). As is the case relative to the front wall of the drawer 56, the top advantageously may be constructed of vinyl clad steel. A cover 44 in the portion broken away is seen to be equipped with a longitudinally-extending, depending portion as at 96. A second such depending portion is provided adjacent the rear longitudinal edge for the purpose of coacting with the rear frame 51 in stabilizing the top in position on the perimetric frame made up of the bulkheads 46 and the front and rear frames.

A commercial example of the inventive drawer 39 involves the elements set forth below in Table I:

TABLE I

|  | Lbs. |
|---|---|
| 16 gauge bulkheads, 4 sq. ft. at 2½ lb. ft. | 10.000 |
| 14 gauge track assembly, 1.5 at 3.125 lb./sq. ft. | 4.688 |
| 11 gauge module frame, 2 at 5 | 10.000 |
| 14 gauge hook plates, ⅛ at 3.125 | 2.060 |
| 20 gauge vinyl drawer ft., 1.7 at 1.25 | 2.125 |
| 18 gauge front liner, 4 at 2 | 8.000 |
| 18 gauge drawer back plate, 2½ at 2 | 5.000 |
| 18 gauge drawer end plate, 2.4 at 2 | 4.800 |
| 18 gauge drawer bottom, 8 at 2 | 16.000 |
| Painted finish, 1½ max. | 1.500 |
| Total weight of parts | 64.173 |
| Carton | 7.000 |
| Total shipping weight | 71.173 |

The average assembly time of such a folding drawer module from the carton runs 1½ to 3 minutes.

The sixth sheet of the drawing shows in FIG. 17 what the trade calls the "gondola" arrangement, wherein open perimetric frames as at 97 are provided in combination with a superstructure 98. The stacked section of FIG. 3 may be utilized on the reverse side of the superstructure, as is shown in dashed line and designated 99. The gondola sections 97 correspond to the bases previously referred to in connection with FIG. 1 under the numeral 38.

Each gondola section 97 includes a front wall 100 and a rear wall or bridge 101. Each gondola section 97 includes a pair of side walls as at 102, although in a multi-unit installation the side walls 102 are shared by adjacent gondolas.

The side wall 102 is equipped with a vertically-extending flange as at 103 (see FIG. 18). The flange 103 is inserted into the end slot or channel 37 of the standard 32. Thereafter, the front end wall 100 is installed, utilizing the clip arrangement shown in FIGS. 21 and 22. For this purpose, the end wall 100 is equipped with keyhole-shaped slots as at 104 (see FIG. 21), provided in an integral flange 104a. These slots are oriented relative to the projections 105 provided in the side wall 102 to develop the hanging anchorage shown in FIG. 18. Advantageously, the projections 105 may be struck or upset from the plane of the side wall 102, as is shown in FIG. 22. I provide the projections extending alternately on opposite sides. For example, projection 105a extends to the right and projection 105b to the left. Hence one wall 102 serves as a common wall for adjacent gondolas.

With an assembly or arrangement such as is seen in FIG. 17, it is desirable to provide levelling means which may take the form of the element seen in FIG. 20. In FIG. 20, the element generally designated 106 is seen to include a plate with integral upstanding inserts 107. The inserts 107 correspond in outline to the side channels 34 provided in the standard 32. The central or axial portion of the standard 32 is equipped with a longitudinally-extending bore as at 108, and into this bore the stud or screw 109 is moved to vary the height of the element 106.

Additional levelling means are provided for engagement with the side walls 102 in the form of the element generally designated 110 (see FIG. 18). Each element 110 includes a formed plate 111 having an angularly-extending lug 112 (see FIG. 19) for engagement with holes 113 in the side wall 102. The formed plate 111 is threaded as at 114 for the receipt of the levelling bolt 115.

The openings 113 are provided at opposite corners of the side wall 102 as seen in FIG. 18—permitting reversal of the side wall 102. Mounted in the openings 113a is an L-shaped bracket 116 defining with the upper edge of side wall 102 a slot 117 for the receipt of the clip 118. The clip 118 is provided as part of the bottom flange 118a of a wall section generally designated 119. In the precise illustration given, the wall unit 119 may be the side wall or bulkhead 46 such as that shown in greater detail in FIG. 23.

In FIG. 23, there is a showing of an arrangement somewhat analogous to that of FIG. 9 but wherein the side bulkhead 46 is supported on the side wall 102 in the fashion seen in FIG. 18. In other words, the frame for the drawer is supported on the gondola section 97 rather than on the standard 32—the showing in FIG. 23 omitting the coupling member 78. The arrangement in FIG. 23 permits stacking of a series of modules each including the side walls 46, the rear wall 51, and the front frame 57'. In FIG. 23, the C-shaped flange 79a of the rear wall 51 is shown in a position for insertion or engagement with the rear C-shaped flange of the element 46—this flange being identical to that designated 60 at the front edge of the element 46.

In the operation of the apparatus provided according to the invention, two basic rectangular units are provided. One is the gondola 97 described in connection with FIG. 17. The gondola 97 can serve either as a goods-receiving enclosure—as in FIG. 17—or, as featured in FIG. 23, as a base for the stacking of other modules. In the latter case, the clips or brackets 116 are advantageously employed. The introduction of a second module makes use of the depending lugs 118 (see FIG. 18) for introduction into the slots 85 (see FIG. 23) of the side wall 46.

In the case of the gondola 97, it is seen that the sides 100 and 102 are connected by means of the latches developed through the projections 105 and the slots 104.

In the case of the frame for the drawer which includes the elements or walls 46, 51 and 57, there is provided the C-shaped flange type of latch as at 60, 65 and 79a.

Latching means are provided in the case of the drawer itself through the Z-shaped clips 88 fitting into the slots 70. Further latching means can be seen in FIGS. 15 and 15A. Thus, the entire assembly is characterized by unique latching means which eliminate the need for bolting or welding, as the case may be.

The facility with which the various modules can be assembled or disassembled provides an especially advantageous operation in the case of seasonal changes. In such a case, the gondola 97 may be disassembled and stored for a period—being replaced by drawer units 39 as in FIGS. 2 and 3, and the panels 100–102 constituting the gondola of FIG. 17 are removed from the standard 32 and stored in a compact, generally rectangular package, while the bulkheads 46 and front frame 57 are employed for developing the drawer units 39 as seen in FIG. 7. These elements, i.e., the elements making up the bulkheads and front frame, are themselves advantageously stored in compact, generally rectangular units during off-seasons, as is the drawer unit itself (see FIG. 16).

Still further, the same basic drawer frame unit 39 can be utilized to develop the display case of FIG. 2, where the top and front are glass-enclosed for the purpose of permitting a patron to view the interior of the unit. In such a case, the roller 63 is threadedly removed from the front frame 57, the front frame 57 inverted, and a light socket as at 63a (see FIG. 2) used as a replacement.

From the foregoing, it is seen that there is extreme versatility and interchangeability of the various modules to provide store fixtures, and the like, best calculated to enhance the salability of goods while requiring minimal storage, thus releasing store decorators from the problems heretofore deemed insurmountable.

While in the foregoing specification I have described the invention in considerable detail, many variations in those details may be made by those skilled in the art without departing from the spirit and scope of the invention.

I claim:

1. Apparatus erectable to provide a drawer, comprising a generally rectangular bottom panel and four side wall panels pivotally connected thereto, and latch means interconnecting adjacent side wall panels, said latch means including a latch member on one panel and a slot in the other panel, said slot having an enlarged part to permit insertion of said latch member and a constricted part therebelow to facilitate relative movement of said latch member.

2. Apparatus erectable to provide store fixtures and other furniture, comprising: a plurality of generally planar wall-providing frames, and latch means on each frame adjacent each end thereof for releasably interconnecting said frames together to provide, in a first condition, a generally rectangular storage unit, and when said frames are disconnected and stacked in superposed fashion to provide, in a second condition, a generally rectangular knocked-down unit, one of said frames having an open central portion defining a drawer opening, two others of said frames being releasably equipped with track means for guiding a drawer introduced into said storage unit through said opening, each of said track means including a generally rectangular panel having latch means adjacent each end thereof for engagement with a latch means of each of said two other frames, said one frame being interlatched with said two other frames to bear on said track means panels to stabilize the same.

3. The apparatus of claim 2 in which each of said track means panels includes an elongated slot for receiving a roller provided on a drawer inserted into said opening, said one frame being equipped with a roller for coaction with the drawer inserted into said opening.

4. Apparatus erectable to provide a drawer, comprising a generally rectangular bottom panel and four sidewall panels pivotally connected thereto, and latch means interconnecting adjacent sidewall panels, said latch means including a pair of slots in said adjacent panels, a latch member slidably mounted in one of each pair of said slots for engagement with the other slot, said slots having portions arranged at a relatively small acute angle relative to each other when the sidewalls are in latched position.

5. Apparatus erectable to provide store fixtures and other furniture, comprising: a plurality of generally planar wall-providing frames, and latch means on each frame adjacent each end thereof for releasably interconnecting said frames together to provide, in a first condition, a generally rectangular storage unit, and when said frames are disconnected and stacked in superposed fashion to provide, in a second condition, a knocked-down unit, said latch means including complementary latch parts on adjacent frames engageable by relative movement in a vertical plane of said adjacent frames to provide, in said first condition, a gondola for receipt of goods, each frame being equipped with a plurality of pairs of openings along the longer sides thereof, adjustable levelling means positioned in the openings along one longitudinal side of each frame, and supporting clips positioned in the openings adjacent the other longitudinal side of each frame.

References Cited by the Examiner

UNITED STATES PATENTS

| | | | |
|---|---|---|---|
| 1,273,925 | 7/1918 | Ritter | 312—333 X |
| 1,352,002 | 9/1920 | Jones | 312—333 X |
| 1,364,245 | 1/1921 | Carman | 312—138 X |
| 1,397,269 | 11/1921 | Dodge | 312—263 X |
| 1,569,158 | 1/1926 | Tobey | 312—343 X |
| 1,805,019 | 5/1931 | Smiley | 312—263 |
| 1,846,485 | 2/1932 | Hart | 312—140 X |
| 2,328,835 | 9/1943 | Motter | 312—333 |
| 2,620,252 | 12/1952 | Restivo | 312—341 X |
| 2,815,649 | 12/1957 | Di Angelus | 312—351 X |
| 2,874,971 | 2/1959 | Devery | 312—249 X |
| 2,985,496 | 5/1961 | Marano | 312—111 X |
| 3,159,437 | 12/1964 | Jentzen | 312—108 |

FOREIGN PATENTS

| | | |
|---|---|---|
| 1,338,243 | 8/1963 | France. |
| 525,674 | 5/1955 | Italy. |

CLAUDE A. LE ROY, *Primary Examiner.*

A. FRANKEL, *Assistant Examiner.*